Sept. 11, 1962   W. A. HALLAM   3,053,527
LEAF SPRING ASSEMBLIES
Filed April 17, 1957   3 Sheets-Sheet 3
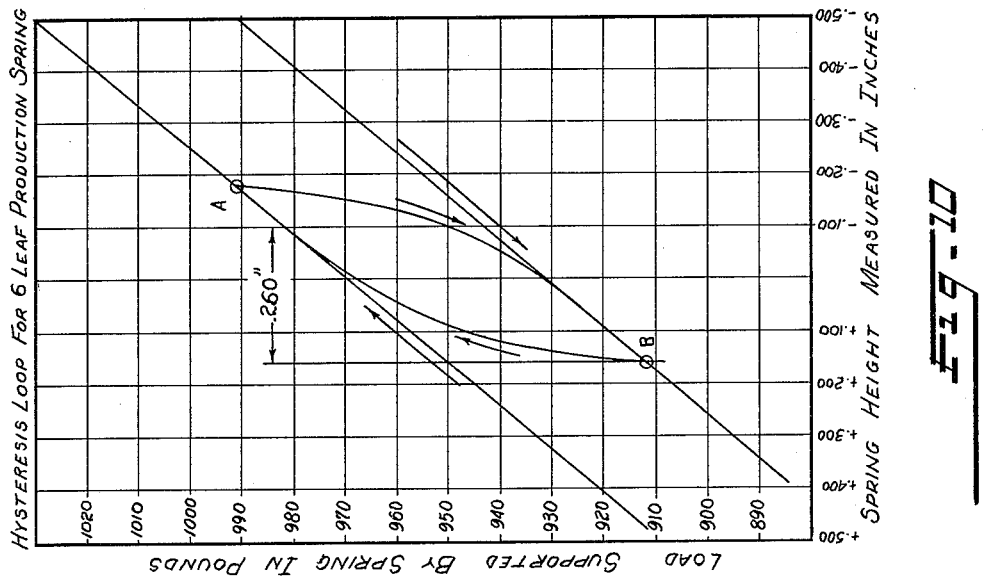
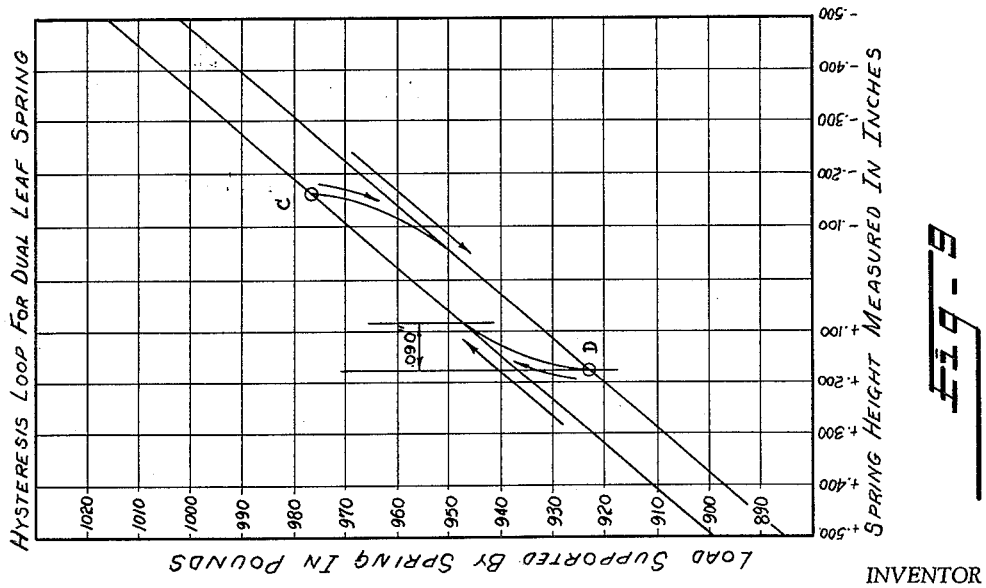
INVENTOR
WILLIAM A. HALLAM
BY
ATTORNEYS

United States Patent Office 3,053,527
Patented Sept. 11, 1962

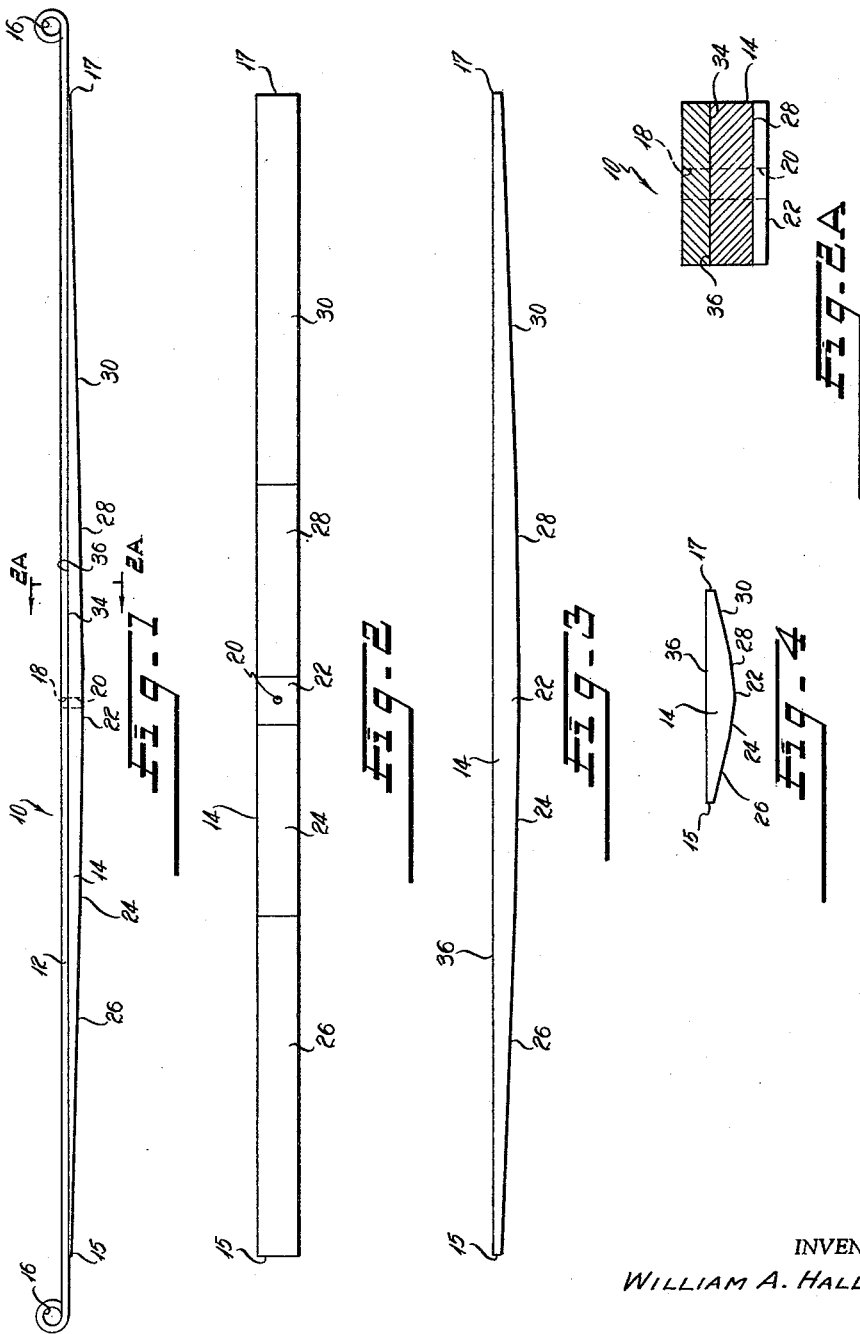

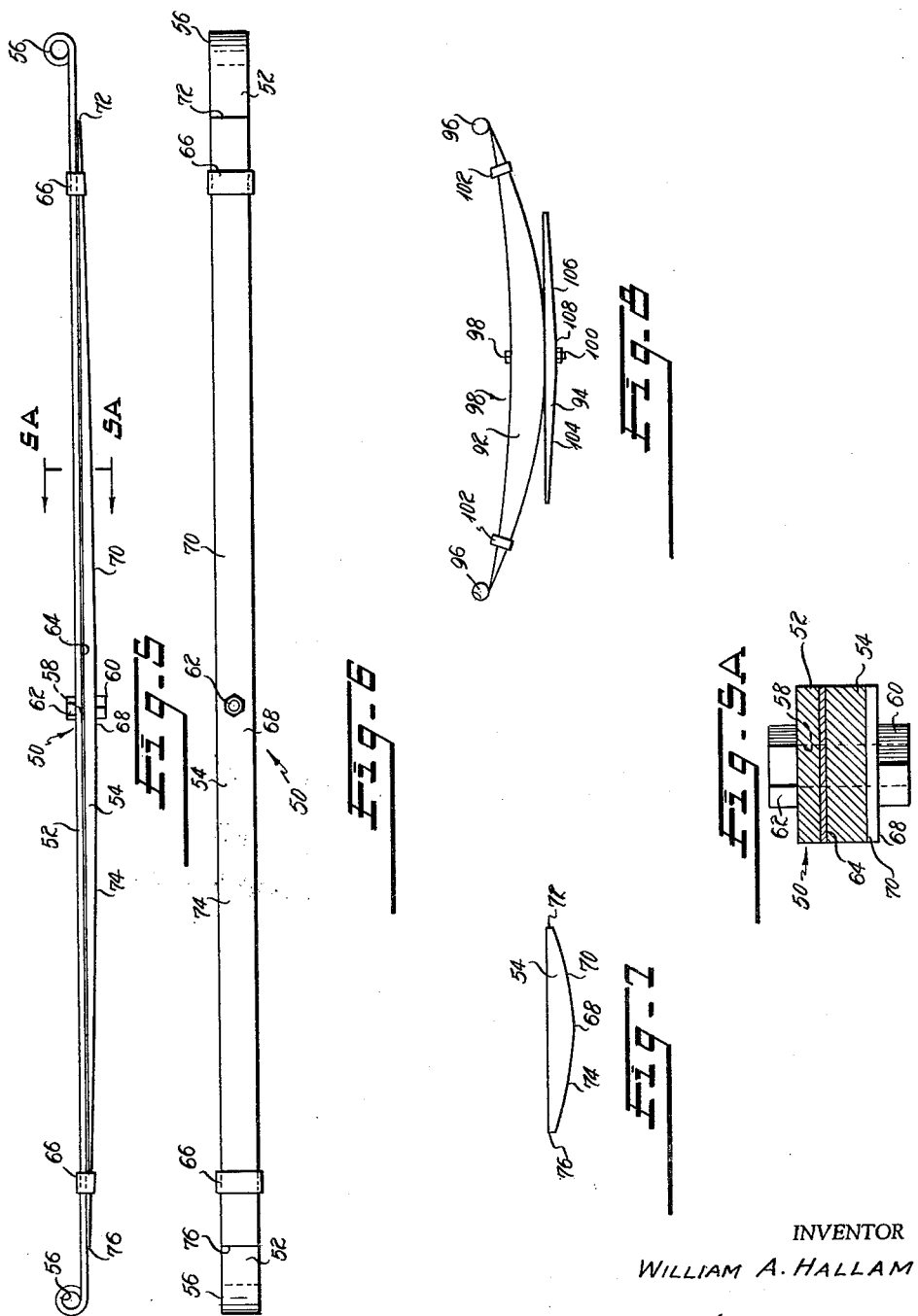

3,053,527
LEAF SPRING ASSEMBLIES
William A. Hallam, Gary, Ind., assignor to Rockwell-Standard Corporation, a corporation of Pennsylvania
Filed Apr. 17, 1957, Ser. No. 653,425
5 Claims. (Cl. 267—47)

This invention relates to improvements in vehicle springs and has particular reference to automotive vehicle leaf spring assemblies including at least one long tapered spring leaf.

Vehicle riding conditions, particularly important where passengers are involved, are improved by the ability of springs to absorb road shocks, and the lower the spring rate (pounds per inch of deflection) the more work the spring will do in absorbing road shocks. Leaf springs were used in early vehicles to provide the shock absorbing features and through the years evolved into the multileaf bundled spring which approaches the constant or uniform spring rate of a parabolic longitudinal section spring. However, these prior art multileaf springs are unduly heavy, the brackets required to support the leaves and provide side sway resistance add considerable weight to the assembly and the large number of leaves inherently result in a considerable amount of friction between leaves which affects spring deflection by increasing the spring rate.. This is particularly apparent during spring deflection reversals. In such prior art multileaf springs, it is generally impossible to obtain a uniform spring stress. There has been constant industrial research in an attempt to overcome problems relating to uniform spring stress, control of and reduction of interleaf friction, but previous developments for alleviating the problems to any degree involve expensive manufacturing and assembly processes. Previous attempts to utilize parabolic tapered leaves have not been satisfactory because of the actual or absolute spring rate of a particular tapered leaf would not remain within acceptable tolerances throughout the spring deflection range. Part of this invention includes the discovery that non-uniform spring rates in tapered leaves were unavoidable because the varying thickness could not be held to sufficiently close tolerances.

This invention utilizes a long leaf with a rolled approximately parabolic longitudinal contour taper along which the tolerance of desired gauge at any location is held to within 0.005 inch. By so forming the long tapered leaf it is found that a substantially constant or uniform rate spring leaf can be obtained. This new rolled long taper leaf is formed with one side flat and is desirably used in a multiple leaf sprling wherein the tapered leaf is secured to another leaf which has end attachment structure. Used with a master flat leaf the full flat surface of the tapered leaf bears against a corresponding flat surface of the master leaf and minimizes interleaf friction by distributing pressure over the full interleaf bearing surface. The stress is as uniform throughout the spring from its ends to the center of the clamping bolt as is necessary to provide an essentially constant or uniform rate two or three leaf passenger car spring. Using the novel long taper leaf in a two-stage spring it is possible to achieve more resistance to drive torque and side sway than was realized with previously used two-stage multi-leaf spring assemblies, at the same time maintaining a low frequency ride for a minimum number of passengers. This invention provides the practical ultimate in a leaf spring assembly as friction between adjacent leaves is minimized and all the advantages of a leaf spring of parabolic longitudinal section comprising optimum deflection, vibration frequency and ride are realized without the disadvantage of greater weight of a three or more leaf spring design Accordingly a primary object of this invention resides in providing a multi-leaf spring assembly including at least two leaves secured at or near their centers, one of the leaves having a flat surface facing toward the other leaf and its opposite surface taper rolled to a substantially parabolic contour from a thick gauge portion at or near the center of the leaf to thin ends.

Another object of this invention resides in the provision of a novel vehicle multi-leaf spring assembly wherein a master leaf is made of constant gauge section and another leaf is taper rolled with one flat side and an opposite side formed with a substantially parabolic contour from a thick gauge portion at or near the center of the leaf to thin ends, the leaves being secured at or near their centers.

Still another object resides in providing leaf structure to minimize interleaf friction in multi-leaf spring assemblies by dstributing the pressure over a full surface area of two adjacent leaves.

A further object resides in providing a two leaf spring with a master leaf of substantially constant cross section provided with an attachment eye at each end, and a secondary leaf having multiple constant taper sections from a thick gauge portion to each end.

A still further object resides in the provision of a two leaf spring with a master leaf of substantially constant cross section provided with an eye at each end, and a secondary leaf having an approximate parabolic longitudinal shape from a thick gauge portion to each thin end.

Another object resides in the provision of a novel two stage multi-leaf spring assembly, one stage of which is a long rolled taper leaf spring which will provide a substantially uniform stress throughout its length.

A further object resides in providing a long rolled taper spring which is flat on one side and has a substantially parabolic longitudinal shape on its other side from at or near its center to its thin ends. This substantially parabolic shape can be a constant essentially parabolic curve or it can be formed by several adjacent constant straight taper sections of different inclinations which effectively result in a substantially parabolic longitudinal section.

Further novel features and other objects of this invention will become apparent from the following detailed description, discussion and the appended claims taken in conjunction with the accompanying drawings showing preferred structures and embodiments, in which:

FIGURE 1 is a side view showing a preferred embodiment of the two leaf spring of this invention with straight constant tapered sections on the secondary leaf;

FIGURE 2 is a bottom view of the tapered secondary leaf of FIGURE 1 clearly illustrating the break lines of the several straight taper portions;

FIGURE 2A is a section taken on line 2A—2A of FIGURE 2;

FIGURE 3 is a side view of the straight taper secondary leaf of the spring in FIGURE 1, the spring thickness being enlarged to accentuate the different inclinations of the straight taper portions;

FIGURE 4 is a diagrammatic view of the secondary leaf, the actual length being greatly reduced to a better visual representation of the approximate parabolic contour;

FIGURE 5 is a side view showing another embodiment of two leaf springs, the secondary leaf having a constant curvature approximate parabolic longitudinal shape from a thick gauge portion near its center to each end;

FIGURE 5A is a section taken on line 5A—5A of FIGURE 5;

FIGURE 6 is a bottom view of the two leaf spring embodiment shown in FIGURE 5;

FIGURE 7 is a diagrammatic view, similar to FIGURE 4, illustrating the parabolic shape of the secondary leaf of the spring of FIGURE 5;

FIGURE 8 is a diagrammatic representative of a two-stage spring assembly wherein the second stage is a single long taper rolled spring;

FIGURE 9 is a hysteresis loop graph for the two leaf spring shown in FIGURES 5 and 6;

FIGURE 10 is a hysteresis loop graph for a more or less conventional six leaf production spring designed for the same normal spring rate and the same load range as the two leaf spring of FIGURES 5 and 6.

With reference to the embodiment of FIGURES 1 and 2, a two leaf spring 10 is made with a master leaf 12 and a secondary lower, taper rolled leaf 14. Master leaf 12 is of conventional construction, having substantially constant cross section dimensions both in width and gauge or thickness throughout its length and is provided with an attachment eye 16 at each end. The master leaf is provided with an opening 18 and the lower leaf 14 with an opening 20 to receive a bolt or other suitable assembly means (not shown) which secures the two leaves at or near their centers.

The spring embodiment of FIGURES 1 and 2 illustrates one actual construction wherein opening 18 in the master leaf 12 is 38¾ inches from the center of one eye 16 and 31¼ inches from the center line of the other eye 16 and the opening 20 in the lower taper rolled leaf 14 is 26 inches from one end 15 and 28 inches from the other end 17.

Although openings 18 and 20 are thus offset from the lengthwise center of spring 10, the leaves may be formed so the openings are on center in a symmetrical spring to meet other design requirements.

Opening 20 extends through a uniformly thick gauge portion 22 of the secondary, taper rolled leaf 14, the portion 22 in the aforementioned actual construction extending 1 inch toward each end from the opening 20. For purposes of convenience, portion 22 will hereinafter be termed the center portion. Taper sections extend from center portion 22 to each end of leaf 14 and each section has two constant taper portions. One constant machine rolled taper 24 extends from center portion 22 and adjoins a second constant machine rolled taper 26 which extends on to end 15 of the leaf. On the right hand part of spring leaf 14 a first constant machine rolled taper 28 extends from the side of center portion 22 and adjoins a second constant machine rolled taper 30 which extends to the end 17 of the leaf.

In the aforementioned actual construction as exemplified by FIGURES 1 and 2, taper 24 extends for 9 inches along leaf 14 at 0 degrees 49 minutes included angle which gives a taper of 0.0142 inch per inch along leaf 14. Taper 26 extends for 16 inches along the leaf 14 at 1 degree 12 minutes included angle which gives a taper of 0.021 inch per inch. Taper 28 extends for 9 inches along leaf 14 at 0 degrees 43 minutes included angle which gives a taper of 0.0127 inch per inch. Taper 30 extends for 18 inches along the leaf 14 at 1 degree 7 minutes included angle which gives a taper of 0.0195 inch per inch. Machine rolled tapers 24, 26, 28 and 30 on lower leaf 14 must be held to plus or minus 0.005 inch variation in gauge thickness, to enable a spring rate which is uniform within desired acceptable limits.

These accurate controlled tapers on the secondary leaf 14 of FIGURES 1 and 2 supply a parabolic spring approximation for spring 10 which furnishes substantially the same vibration frequency and ride as a longer and heavier parabolic multi-leaf spring bundle. Spring 10 enables a ride closely approaching the ride given by coil and/or torsion springs and accomplishes this with a light weight spring using less metal than other springs designed for similar service.

Since the only surfaces of spring 10 in slidable contact are surfaces 34 of leaf 12 and 36 of leaf 14, the interleaf friction between the two leaves amounts to only approximately one half the interleaf friction of a three leaf spring. This interleaf friction, if excessive, is undesirable as it reverses itself in both directions of spring deflection, it resists spring deflection and retards spring return, thus affecting spring rate and adversely affecting both vibration frequency and ride.

FIGURES 5 and 6 illustrate another embodiment of a two leaf spring 50 with a master leaf 52 and a lower taper rolled leaf 54. Master leaf 52 is of conventional construction having substantially constant cross section both in width and gauge throughout its length and is provided with an eye 56 at each end and is essentially identical to the master leaf 12. The master leaf 52 is provided with opening 58 and lower leaf 54 with opening 60 to receive a bolt 62 or other suitable assembly means. Openings 58 and 60 and bolt 62 are located at or near the center of leaf spring 50. It is desirable that a liner 64 of extruded plastic such as "Cycolac" which is a high-impact, styrene type, rigid, thermoplastic resin, which extends the full length of tapered leaf 54, be used between master leaf 52 and lower leaf 54 to reduce and control the interleaf friction. Suitable clips 66 near the ends of lower leaf 54 may be used to hold the leaves 52 and 54 in assembled alignment.

Opening 60 and hence bolt 62 extend through a uniformly thick gauge spring seat portion 68 of the lower taper rolled leaf 54. The leaf 54 is taper rolled to provide a flat upper surface and a curved lower surface of substantially parabolic longitudinal contour in a constant stress section 70 from the center spring seat portion 68 to thin end 72 and to provide a flat upper surface and a curved lower surface of substantially parabolic longitudinal contour in a constant stress section 74 from the center spring seat portion 68 to thin end 76. Parabolic longitudinal sections 70 and 74 may be the same length or different in length as necessary to meet spring design requirements. It is important that the curvature is kept to within 0.005 inch of a true parabolic curve in order to ensure an acceptable substantially constant or uniform spring rate.

The upper flat surface of the parabolic longitudinal sections 70 and 74 of taper rolled leaf 54 is effective to distribute the pressure between master leaf 52 and leaf 54 over the length of leaf 54 from spring seat portion 68 to ends 72 and 76. The pressure between leaves 52 and 54 being distributed over such a large area, rather than concentrated in two small areas near the ends of leaf 54, greatly reduces the unit area pressure between the two leaves. This is an important factor in reducing interleaf friction, prolonging the life of liners 64, when used, and giving controlled damping of spring 50. Dual leaf spring 50 has less interleaf friction than any spring, for comparable service, of three or more leaves tested at any supported load.

A two-stage spring 90 is diagrammatically illustrated in FIGURE 8 and consists of a multileaf upper spring 92 and an auxiliary stage single leaf lower spring 94. Upper spring 92 can be a multileaf assembly of tapered leaves as described above or a conventional multileaf assembly, e.g., a bundle of six leaves of uniform gauge with the upper leaf having eyes 96 at each end for attachment to a vehicle body. A center bolt 98 with lock nut 100 secures the two stages of the spring assembly 90 together at or near their centers. Conventional clip members 102 near the ends of the multileaf bundle help maintain longitudinal leaf alignment.

The single leaf lower spring 94 has a flat upper surface and a taper rolled lower surface providing decreasing taper sections 104 and 106 from a thick gauge center portion 108. In FIGURE 8 the lower surface has constant curvature inclination from each side of the center portion 108 however multiple constant taper inclinations as shown in the lower leaf 14 of FIGURES 1–4 can be used and more than two inclinations can be used if desired to more closely approach a parabolic contour within the aforementioned 0.005 tolerance. If desired the second stage can be a two leaf spring of the type hereinbefore described with reference to FIGURES 1–7, the eyes being omitted.

By using the long rolled taper spring leaf in two-stage vehicle springs, spring weight is reduced 15 to 23 percent from that of conventional multileaf two stage springs, in which the second stage was a spring pack of six or seven leaves, and the reduction in number of leaves increase resistance to side sway and to drive torque from a spring suspended driving axle.

In multileaf spring packs, whenever interleaf friction is excessive the rate of the spring is increased by a considerable amount immediately after loading reversal. During passage of a vehicle over rough roads, the direction of spring loading will be changing very rapidly so that most of the time the springs will not be operating at the normal spring rates. The less work done by the springs in absorbing the energy of road shocks the more the vehicle, passengers and load must absorb. The two leaf springs of this invention, as exemplified by springs 10 and 50, with low interleaf friction will absorb more road shock than other previously known multileaf springs.

A comparison of FIGURES 9 and 10 shows the relative rates and friction characteristics of the new improved two leaf spring 50 and a six leaf production spring. The two springs tested, whose characteristics are illustrated by the hysteresis loop graphs of FIGURES 5 and 6, were both equipped with extruded plastic "Cycolac" liners for reduced interleaf friction and are both designed for a normal spring rate of 120 pounds per inch deflection. In FIGURES 9 and 10, deflection or displacement of the spring at the axle is shown as the abscissa and spring loading as the vertical ordinate. The slope of the curves, i.e. an increment of loading divided by the corresponding spring displacement, determines the spring rate. The lower the spring rate (pounds per inch deflection) the softer the spring or the more work the spring will do in absorbing road shocks. The slope of the hysteresis loop curves plotted in FIGURES 9 and 10 at any point determines the rate of the spring for that point or moment. At the moment following a reversal of spring loading the rate of the six leaf production spring (FIGURE 10 points A and B) in 1100 pounds per inch deflection while for the two leaf spring (FIGURE 9 points C and D) the rate is 500 pounds per inch deflection. In both springs the spring rate immediately following loading reversal has increased over the normal spring rate of 120 pounds per inch deflection, the rate of the six leaf production spring having increased by 9 times while the rate of the two leaf spring having increased only 4 times. The six leaf production spring requires 0.26 inch deflection to return to the normal spring rate after a loading reversal which is approximately three times that of leaf spring 50 which returns to a normal spring rate after only 0.09 inch deflection.

From the foregoing it is apparent that there is hereby provided new and improved leaf spring assemblies of single stage or two stage configuration. Single stage springs are disclosed having only two leaves, a master leaf of substantially constant cross section both in width and gauge along its length from eye to eye and a machine taper rolled lower leaf of constant width with approximate parabolic longitudinal contours from a thick gauge portion to each end. The invention provides two-leaf springs in which interleaf friction is minimized by distributing interleaf pressure over the full interleaf bearing surface area and by using an extruded plastic liner between the leafs. The long roled taper leaf can be used as a single or in a multileaf spring in a two stage spring to reduce weight and provide a more uniform spring rate throughout the range of spring deflection.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. A leaf spring assembly comprising: at least an upper leaf; at least a lower leaf; means securing said upper leaf to said lower leaf near their centers and permitting relative longitudinal movement between said leaves throughout the remaining portions of said leaves; the surface of one of said leaves which faces toward the other of said leaves being substantially flat from end to end and the opposite surface of said one leaf having rolled portions constituting a substantially parabolic longitudinal section normal to said substantially flat side tapering from near the center to each end, having a thickness tolerance at all locations along the tapered portions of .005 inch from a true parabolic longitudinal section and resulting in a substantially uniform spring rate; and attachment means on the ends of said other leaf.

2. A leaf spring assembly as defined in claim 1, wherein said other spring leaf is a flat leaf of substantially constant cross section and said substantially flat surface of said tapered leaf is disposed in associated structural relation to a surface of said flat leaf to distribute the pressure between said two spring leaves along the said substantially flat surface of said tapered leaf and the associated surface of said flat leaf.

3. A leaf spring assembly as defined in claim 1, wherein the tapered portions of said one leaf are formed with multiple constant angle tapers.

4. A leaf spring assembly as defined in claim 3, wherein said one leaf has at least two tapered portions between a position near its center and each of its ends, the constant taper of each of said two tapered portions having a different value whereby each spring section of said one leaf approximates a parabolic longitudinal constant stress section.

5. A leaf spring assembly as defined in claim 1 wherein said upper leaf is a steel leaf substantially flat on both sides and of substantially constant width and thickness from end to end, said lower leaf is of rolled steel of substantially constant width from end to end and secured at its central portion to the central portion of said upper leaf with an upper substantially flat surface thereof lying along the substantially flat lower surface of said upper leaf, and said lower leaf is of constantly decreasing tapered thickness from said central portion toward its opposite ends.

References Cited in the file of this patent

UNITED STATES PATENTS

| | | |
|---|---|---|
| 69,197 | English | Sept. 24, 1867 |
| 124,220 | Saladee | Mar. 5, 1872 |
| 129,297 | Saladee | July 16, 1872 |
| 166,060 | Bauer | July 27, 1875 |
| 285,324 | Vose | Sept. 18, 1883 |
| 1,814,214 | Gross | July 14, 1931 |
| 2,580,975 | Tea | Jan. 1, 1952 |
| 2,597,299 | Crites et at. | May 20, 1952 |
| 2,608,752 | Schilling | Sept. 2, 1952 |

FOREIGN PATENTS

| | | |
|---|---|---|
| 555,301 | France | Mar. 21, 1923 |